United States Patent [19]

Schara et al.

[11] Patent Number: 4,761,186

[45] Date of Patent: Aug. 2, 1988

[54] METHOD OF PURIFYING STARCHES AND PRODUCTS PRODUCED THEREFROM

[75] Inventors: Robert E. Schara, Princeton Junction; Jay H. Katcher, Cranbury, both of N.J.

[73] Assignee: General Foods Corporation, White Plains, N.Y.

[21] Appl. No.: 897,674

[22] Filed: Aug. 18, 1986

[51] Int. Cl.[4] ............................................. C08B 30/00
[52] U.S. Cl. ........................................ 127/71; 127/65; 127/33; 127/70; 210/651; 210/805; 426/661
[58] Field of Search .................. 127/70, 71, 54, 55, 127/39, 65; 210/650, 651, 805; 426/661

[56] References Cited

U.S. PATENT DOCUMENTS

| | | | |
|---|---|---|---|
| 3,342,729 | 9/1967 | Strand | 127/54 |
| 4,069,103 | 1/1978 | Muller | 195/11 X |
| 4,228,199 | 10/1980 | Chiu et al. | 426/578 |
| 4,280,815 | 7/1981 | Oberhardt et al. | 422/55 |
| 4,477,480 | 10/1984 | Seidel et al. | 426/578 |
| 4,562,086 | 12/1985 | Smolka et al. | 426/578 |

OTHER PUBLICATIONS

Dorr-Oliver Ultrafiltration Systems, Bulletin No. 10-9, (Dorr-Oliver Inc. 1984).

*Primary Examiner*—H. M. S. Sneed
*Assistant Examiner*—Chung K. Pak
*Attorney, Agent, or Firm*—Thomas R. Savoie; Daniel J. Donovan

[57] ABSTRACT

Aqueous slurries of physically and/or chemically modified starch solids, having high starch solids levels, are purified by means of ultrafiltration. An ultrafiltration system is started by circulating water and then the modified starch slurry is added to raise the starch solids level of the stream fed to the ultrafiltration unit to between 20 and 32% by weight. Water is added to the ultrafiltration system, preferably at the same rate at which water is removed from the system in the permeate. After the desired level of purification is achieved the slurry is concentrated to above 35% and then dried.

6 Claims, No Drawings

METHOD OF PURIFYING STARCHES AND PRODUCTS PRODUCED THEREFROM

BACKGROUND OF THE INVENTION

Numerous processes exist in the prior art for either physically or chemically modifying starches. Typically the modification to the starch is conducted while the starch is dispersed in an aqueous slurry. An integral step in these starch modification processes is the separation of the treated or modified starch solids from the aqueous slurry and the water washing of the separated starch solids before these solids are dried. These separation and washing steps are necessary in order to remove undesired compounds from the desired modified starch solids. These undesirable compounds may be naturally-occuring materials such as the flavors which are present in cereal starches or may be added chemicals, reaction products or salts which remain with the modified starch solids as a result of a chemical modification process and/or a pH adjustment step. Chemical modification usually involves cross-linking with, for example, phosphorous oxychloride, epichlorohydrin, acrolein, di-epoxy reagents, and the like. While such modifications can benefit the paste character and texture of the starch, the cross-linking agents are subject to regulations which limit the level of these materials which may be contained in the starch product. A disadvantage which is present with the prior art separation and washing techniques is the loss of starch solids contained in the aqueous phase of the slurry and in the wash water. This loss constitutes an economic penalty both in terms of lost product and the cost of disposing of these solids.

An example of a process wherein physically modified starch solids are washed with water is disclosed in U.S. Pat. No. 4,477,480 to Seidel et al. According to this patent the off-taste/flavor present in cereal starch, such as corn starch, is removed by forming an aqueous, 40% by weight, starch slurry, raising the pH of the slurry to between about 10 and 12.5, filtering the slurry to separate the treated starch solids, washing the separated solids with water, and then drying the washed solids. Examples in which chemically-modified starch solids are filtered, washed and then dried are set forth in U.S. Pat. No., 4,562,086 to Smolka et al. where a 37.2% by weight starch slurry is etherified and cross-linked and 4,228,199 to Chiu et al. where a 44% by weight starch slurry is cross-linked.

SUMMARY OF THE INVENTION

The present invention relates to a process for purifying either physically or chemically modified starches by subjecting a relatively, high-solids aqueous slurry of the modified starch material to ultrafiltration for the purpose of removing undesirable, soluble low molecular weight compounds which are contained in the slurry. As noted above, flavors, salts, chemical reagents and/or chemical reaction product are the types of compounds which may advantageously be separated from the modified starch solids.

It has previously been known to concentrate starch-containing waste streams which result from food processing operations such as rice processing operations using ultrafiltration. The starch solids concentration of these waste streams have been relatively low, typically less than about 5%. It has not been thought possible to subject aqueous slurries containing starch solids at levels in excess of about 12% by weight to ultrafiltration as the available ultrafiltration units would plug due to the build up of starch on the surfaces of the ultrafiltration membrane.

A novel process has now been identified wherein aqueous starch slurries having a starch solids content of from about 25% to about 40% by weight can be subjected to ultrafiltration for the purpose of purification alone or purification followed by concentration. It has been found that high concentration starch slurries can be effectively purified via ultrafiltration if the feed to the ultrafiltration unit contains a gradual increase in starch solids and if the starch solids level of the slurry is kept relatively constant during the purification process. After purification is completed, the starch solids concentration may be increased to produce a slurry which is suitable for drying.

In operation, the build-up of starch solids in the feed to the ultrafiltration unit or process is effected by metering the starch slurry into an aqueous stream or a feed tank containing an aqueous fluid and continuously circulating this diluted slurry through the ultrafiltration system. The water added to the system lowers the starch solids concentration of the diluted slurry to between about 20% and 32% by weight. During the purification process, additional water is added to the ultrafiltration system to maintain the starch solids concentration in the feed to the ultrafilter at a level between about 20% and 32%, and typically at a relatively constant level. This can accomplished by adding water at the same rate water is removed from the ultrafiltration system in the permeate.

After the desired degree of purification has been effected, typically after the permeate exceeds about three times the volume of the initial (i.e., 25 to 40% starch solids) modified starch slurry the flow of additional water is stopped and the concentration of the starch solids within the slurry is increased to a level in excess of 35% by weight. This concentrated slurry is then dried such as by drum drying or spray drying or any other conventional drying process.

DESCRIPTION OF THE INVENTION

Modified starches are typically prepared by forming an aqueous slurry of raw starch at a starch solids content of about 40% by weight and then subjecting the aqueous slurry to temperature, pH, pressure, and/or chemical reagents to effect the desired physical and/or chemical modification of the starch. Concentrations much in excess of 40% are quite viscous and difficult to handle or process. At concentrations much below 40% the modification step is not economical. Therefore this invention will be spoken of in terms of the purification of aqueous starch slurries having a starch solids content of up to about 43%, preferably up to 40%.

These slurries are purified or freed from flavor, salts or chemicals via ultrafiltration wherein water-soluble components having a molecular weight below the molecular limit of a selectively permeable membrane filter will pass from the ultrafiltration unit in a aqueous permeate stream while larger molecules will be retained within the ultrafilter. As starch molecules have a molecular weight many times larger than the compounds which are sought to be separated, numerous commercially-available membranes are suitable for use in this invention.

Membrane types HFM-130, HFM-100 and HFM-180 with molecular weight cutoffs of 5,000, 10,000 and 18,000, respectively (available from Abcor, Inc., Wilmington, Mass.) are suitable for use in this invention. As will be recognized by those skilled in the art, membrane selection would be, in part, based on flux rate so as to design a system utilizing a low membrane area while achieving a desired production rate.

The purification process of this invention will be most readily described in terms of a batch operation; however, the invention is also applicable to multi-stage continuous operation. All percents, unless otherwise specified are percents by weight.

According to the batch mode water is added to a feed tank and the ultrafiltration system is started by re-circulating this water. The slurry of modified starch solids is then slowly added into the feed tank until a starch solids level of from 20 to about 32%, preferably about 30%, starch solids is achieved. The diluted slurry is continuously re-circulated within the ultrafiltration system with water being added to the slurry to maintain the solids content below about 32%. Preferably water is added to the slurry at the same rate as water from the slurry passes, along with the low molecular weight compounds, through the membrane and into the permeate stream.

The addition of water to the recirculating slurry, the retenate stream, at the same time permeate is withdrawn is known as diafiltration. Usually this addition is made to the feed tank through which the slurry is recirculated. According to the present invention diafiltration is continued until the volume of the permeate exceeds about three times the volume of the undiluted modified starch slurry. At the conclusion of the diafiltration mode of operation, water addition is stopped and the concentration of the slurry is allowed to increase to 35% or higher, typically between 38 and 42%.

The purified and, if desired, concentrated modified-starch solids slurry produced via the ultrafiltration process of this invention is suitable for drying. Drying may take place in accordance with conventional drum drying techniques, by following the spray-drying technique of U.S. Pat. No. 4,280,851 to Pitchon et al., or by other suitable means. This invention is suitable as a replacement for the separating and washing steps used in the preparation of a clean-flavored cereal starch as described in the aforementioned Siedel et al. patent or the separation and washing steps utilized in the preparation of chemically-modified starches as described in the aforementioned Smolka et al. and Chin et al. patents.

This invention is further described but not limited by the following example.

EXAMPLE 57 parts of water was added to a reactor tank and 6.8 parts of sodium sulfate was dissolved in the water. 43 parts of corn starch was dispersed in this sulfate solution. Sufficient 3% sodium hydroxide solution was added to raise the pH of the dispersion to 11.3 and then 3.01 parts of propylene oxide was added to the reactor. The reactor was sealed and the starch propoxylation reaction was carried out for 12 hours at 50° C. after which time the reacted slurry was found to have a pH of 11.8 and a conductivity of 38,000 umho/cm (as measured with a Fisher conductivity meter Model 152, a product of Fisher Instrument Co., Pittsburg, Pennsylvania). The reacted slurry was then ultrafiltered at about 85° F. (29.4° C.) in accordance with this invention.

Water was added to an ultrafiltration feed tank and the water was then circulated through a two-module ultrafiltration unit and back to the feed tank. The ultrafiltration unit utilized a spiral-wound membrane (type HFM-180 from Abcor, Inc.) which has an average molecular weight cut-off of 18,000.

Two hundred and twenty gallons (832.8 1) of the reacted slurry was then added to the feed tank until a starch solids level of 30% was obtained. During the start-up phase the permeate is re-circulated. After the system reached equilibrium the permeate is discarded and make-up water is added to the feed tank at a rate sufficient to maintain a 30% starch solids level. Water containing small molecular weight compounds such as salts, corn flavor notes, chemical reaction products, unreacted propylene oxide, etc. exited the ultrafiltration unit in the starch-free permeate stream.

The slurry was continuously recycled back through the feed tank as retentate and the system was run until the volume of permeate was 3.5 times the volume of the 38% starch slurry which was fed to the feed tank from the reactor. At this point the flow of water to the feed tank was stopped and the slurry was concentrated in the ultrafiltration system to a starch solids level of 38%. The total time utilized for ultrafiltration and concentration was about 6.7 hours. The pH of the slurry was then reduced to about 8.0 by the addition of phosphoric acid.

This concentrated and purified slurry was found to have a conductivity of less than 3,000 umho/cm an indication of the much reduced salt level in the slurry. The purified slurry was then spray-cooked and dried in accordance with the aforementioned U.S. Pat. No. 4,280,851. Instant puddings prepared with this pregelatinized corn starch did not exhibit the corny flavors which would be present in pudding prepared with comparable unpurified, pregelatinized, and modified corn starch.

Having thus described the invention what is claimed is:

1. A process for purifying chemically modified starches comprising the steps of:
   (a) forming an aqueous slurry of chemically modified starch solids, said slurry having a starch solids content of from 35 to 43% solids by weight;
   (b) adding water to a feed tank and then circulating water between the feed tank and an ultrafiltration unit, said unit containing one or more membranes which will retain starch molecules and permit passage of salts, flavors, and chemical reagents; thereafter,
   (c) adding the slurry to the circulating water in the feed tank to gradually increase the starch solids level of the resultant diluted slurry circulated to the ultrafiltration unit to between 20% and about 32% by weight.
   (d) continuously circulating the diluted slurry through the ultrafiltration unit and adding water to the diluted slurry in order to maintain a starch solids level of 20% to about 32% by weight, said circulating being conducted for a period of time effective to remove said salts, said flavors and said chemical reagents from the slurry; thereafter,
   (e) stopping the flow of added water but continuing the circulation of the slurry through the ultrafiltration unit in order to raise the starch solids level to above 35% by weight; and then,
   (f) drying the resulting purified starch slurry recovered from said ultrafiltration unit.

2. The process of claim 1 wherein the starch of said aqueous slurry of step (a) is cereal starch.

3. The process of claim 2 wherein the cereal starch is corn starch.

4. The process of claim 1 wherein the starch solids level achieved in step (c) is about 30% by weight.

5. The process of claim 1 wherein said drying is accomplished by spray drying.

6. The process of claim 1 wherein said drying is accomplished by drum drying.

* * * * *